May 23, 1939.  A. E. W. JOHNSON ET AL  2,159,659
HOPPER CONSTRUCTION
Filed Oct. 28, 1936    2 Sheets-Sheet 1
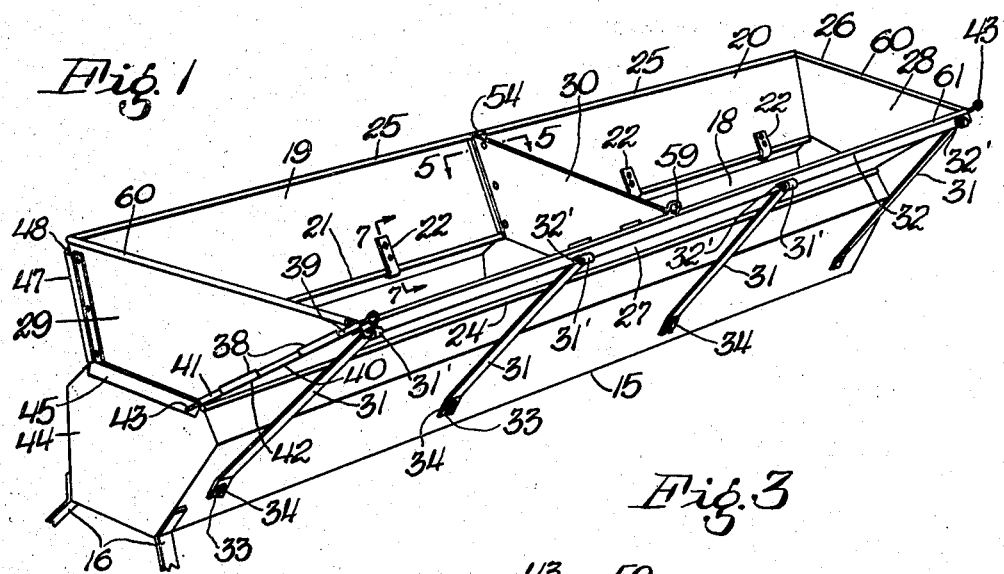
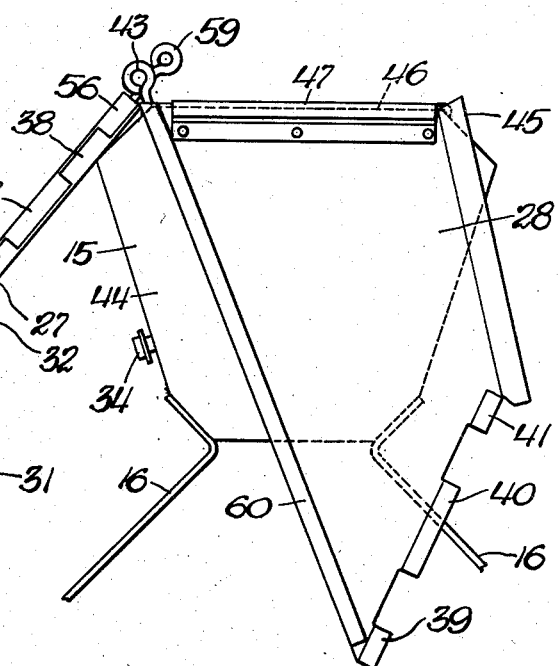
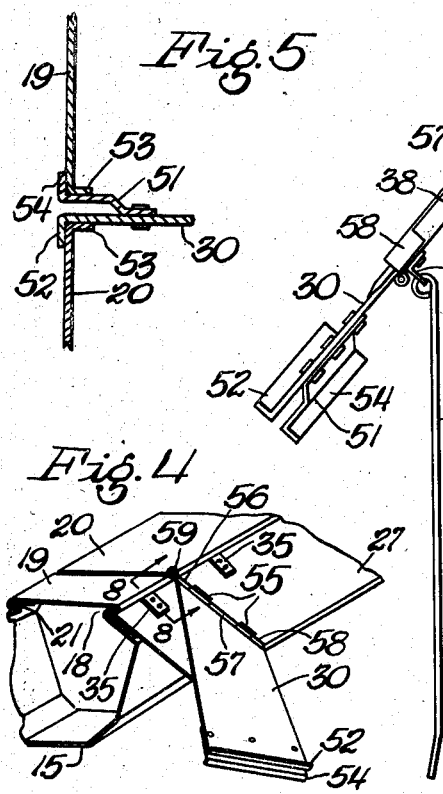
Inventor
A. E. W. Johnson
G. M. Kriegbaum
By
Atty.

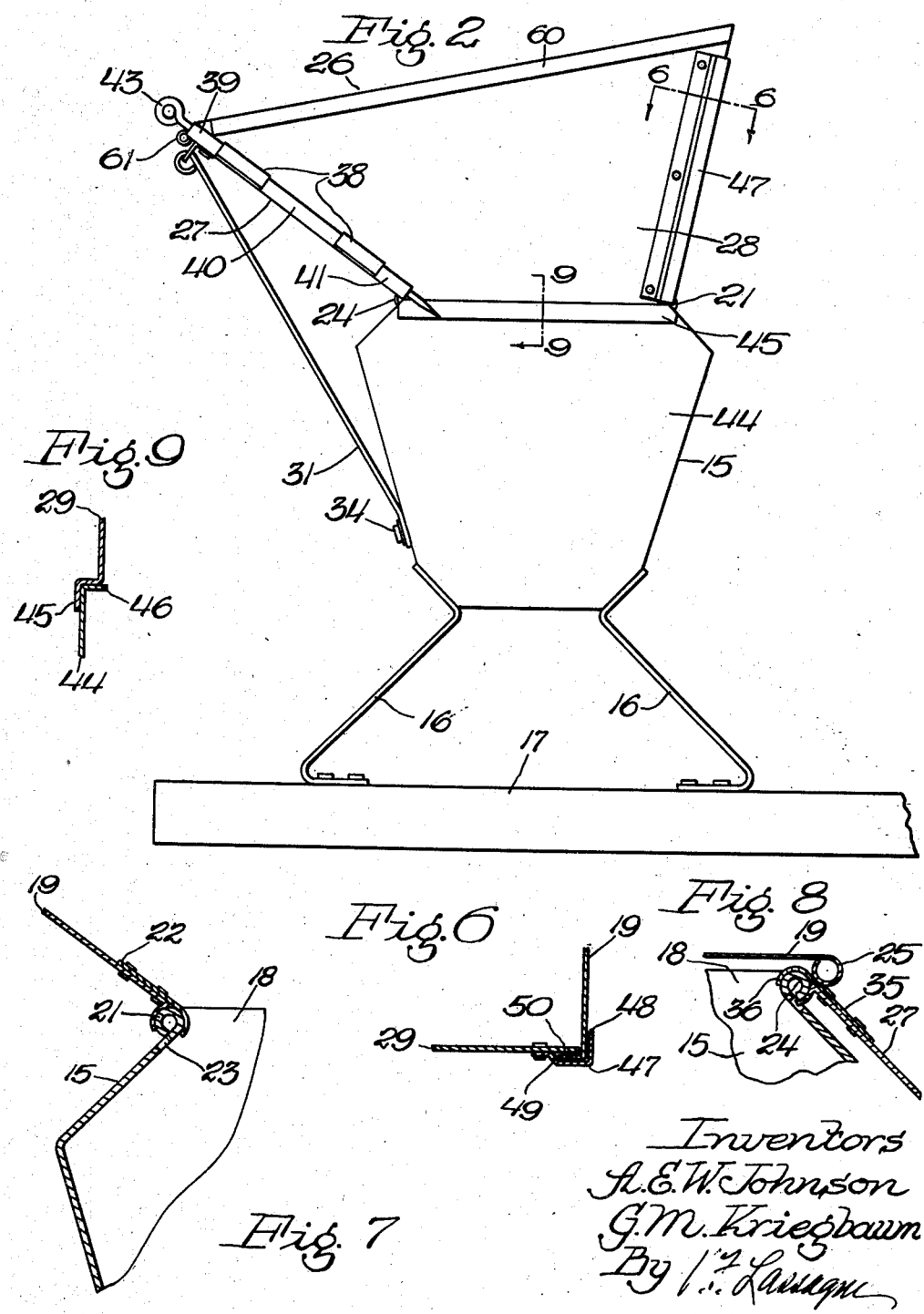

Patented May 23, 1939

2,159,659

UNITED STATES PATENT OFFICE 2,159,659

HOPPER CONSTRUCTION

Arnold E. W. Johnson, Chicago, Ill., and George M. Kriegbaum, Richmond, Ind., assignors to International Harvester Company, a corporation of New Jersey Application October 28, 1936, Serial No. 108,002

12 Claims. (Cl. 221—118)

This invention relates to improvements in grain drill hopper constructions and more particularly to an extension hopper for the usual grain drill hopper.

The main object of the invention is to provide increased storage capacity for grain drill hoppers.

A more specific object of the invention is to provide an extension hopper construction which may be readily attached to the usual grain drill hopper and also to provide means whereby the extension hopper may be collapsed when not in use.

In accomplishing the foregoing objects and other minor objects, one specific hopper construction will hereinafter be described and the invention then defined in the claims. The preferred forms and the improved structure are illustrated in the accompanying drawings wherein:

Figure 1 is a perspective view showing a grain drill hopper with the extension hopper in place;

Figure 2 is a side elevation showing the extension hopper in position;

Figure 3 is a side elevation similar to that in Figure 2 with the extension hopper collapsed;

Figure 4 is a perspective view of a portion of the grain drill hopper and extension hopper with the extension hopper in its collapsed position showing the position taken by the center support for the grain drill hopper covers;

Figure 5 is a section along lines 5—5 of Figure 1 looking in the direction of the arrows showing a portion of the center support for the grain drill covers;

Figure 6 is a section along line 6—6 of Figure 2 looking in the direction of the arrows showing the means for attaching the ends of the extension hopper to the grain drill cover;

Figure 7 is a section on line 7—7 of Figure 1 looking in the directon of the arrows showing the hinge construction for the grain drill cover;

Figure 8 is a section along line 8—8 of Figure 4 looking in the direction of the arrows showing the means for holding the extension hopper side in place; and, Figure 9 is a section along line 9—9 of Figure 2 looking in the direction of the arrows showing the means for supporting the extension hopper end on the grain drill hopper end.

It will be understood that, in a grain drill or other machine to which the extension hopper is to be attached, the grain drill hopper proper is of a well-known steel hopper construction. It has been found that in large fields the usual steel grain hoppers have not sufficient capacity to enable the operator to sow a complete strip across the field and it has been necessary to have platforms or to carry bags of grain to be sown thrown across the top of the grain drill hopper in order that the operator can complete the strip across the field by adding the additional seed supply. It is, therefore, the purpose of the invention to provide an extension hopper wherein grain may be placed to give additional storage capacity and at the same time to provide supports for carrying the grain bags, if it is desired, or for placing additional sacks of grain on top of the grain already stored in the extension hopper.

In accomplishing these objects a grain drill hopper 15 is supported in the usual manner by a support 16 attached to a grain drill frame 17. The grain drill hopper 15, as best shown in Figures 4, 7, and 8, has the upper ends of the hopper extending inwardly to provide a narrowed opening 18 which is covered by steel covers 19 and 20. In large grain drills such as the one to be described the cover for the hopper is usually divided as in this instance by the covers 19 and 20.

In Figure 7 the cover 19 is shown hinged to a rolled bead 21 of the hopper extending along the opening 18. A hinge for the cover 19 is formed by a strap 22 bent at its lower end and shaped to conform to the shape of the bead 21. As the cover is lowered to close the opening 18 the hinge strap 22 extends through an opening 23. Each cover 19 and 20 is provided with a plurality of these hinges formed as described above. In the usual grain drill hopper construction the covers 19 and 20 are hinged at the forward side of the grain drill hopper so that they may be opened with the covers extending upwardly and forwardly in order that the grain may be poured in from the rear of the grain drill. As shown in Figures 4 and 8, the rear edge of the opening 18 of the grain drill hopper 15 has a rolled edge or bead construction 24 similar to the rolled edge 21. The cover 19 or 20 has at its rear edge a rolled edge or bead 25 which in the closed position of the cover extends over the rolled edge 24 to close the hopper.

An extension hopper 26 which is about to be described is readily attached to the grain drill hopper 15 and at the same time when not in use, the extension hopper may be collapsed and folded down. The extension hopper 26 is formed to engage the opening 18 of the grain drill hopper 15. The extension hopper 26 is formed from a plurality of separable parts which may be readily attached to and detached from each other and comprise a side member 27, end members 28 and 29, and a center supporting member 30 for the grain drill covers 19 and 20, as best shown in Figure 1. In the open position of the extension hopper, the rear side member 27 extends transversely the length of the hopper opening 18 and is supported in an upwardly and rearwardly extending position by a plurality of braces 31 which provide detachable means for bracing the side wall member of the extension hopper. The braces 31 are pivotally secured at their upper ends to a transversely extending member 32 secured to the extension hopper side 27 at its upper end. The brace member 32 acts to stiffen the side member 27. Each of the braces 31 is pivotally mounted to the transverse member 32 by having a rolled portion 31' extending through a slot 32' in the brace member. The braces at their lower ends are detachably secured to the grain drill hopper 15 by having slotted ends 33 which engage a bolt or other securing member 34. The side member 27 of the extension hopper is so formed as to engage the bead 24 of the hopper opening 18 to provide a grain tight seal and means for pivotally connecting the side wall member of the extension hopper to the hopper of the dispensing device. As best shown in Figure 8, in order to latch the extension side member 27 in its lowered position, a hinge member 35 is bolted or otherwise secured to the side member 27 and has at its lower end, when in raised position, as shown in Figures 1 and 8, a hook portion 36. The hook portion 36 acts as means to retain the side member 27 in its lowered position from becoming detached from the grain hopper 15. The portion 36 is curved to conform to the bead 24 of the rear edge of the grain hopper 15.

Each end of the extension hopper side member 27 has a plurality of rolled portions 38 which form, with roller portions 39, 40, and 41 of the extension hopper members 28 and 29, a hinge construction 42 providing detachable means for pivotally connecting the side member 27 with the end members 28 and 29. The rolled edges 38, 39, 40, and 41 are so formed that a detachable pintle or pin 43 may be passed through the bead to secure the end and side members together.

The end members 28 and 29, as best shown in Figures 1, 2, and 9, are supported on each end 44 of the grain drill hopper 15 by an outwardly and downwardly extending angular shaped portion 45 which engages an inturned edge 46 of the hopper end 44, as best shown in Figure 9. The supporting portion 45 providing means for mounting the end wall members on the hopper of the dispensing device extends the width of the hopper opening 18 and is formed at its ends to conform to the upper portion of the hopper 15. The front end of the extension ends 28 and 29, as best shown in Figures 1, 2, and 6, has a corner member 47 forming a sliding connection with the covers 19 and 20 of the grain drill hopper. The member 47 providing detachable means for connecting the end wall members to the lid of the hoppers, at its front side, as shown in Figures 1 and 6 has an inwardly extending portion 48 engaging the top side of the cover 19 or 20. As each corner construction 47 is similar but of opposite hands for the respective ends 28 and 29, only one will be described and like reference characters will denote similar parts. The member 47 is so shaped as to form a slot or slide 49 with respect to the end member and with the cover 19. The member 48 is spaced away from the end member 29 to form a slot to engage the cover 19 and the member 47 is also formed and spaced away from the end 29 laterally to form a slot for a down-turned edge 50 of the cover 19. The member 47 is bolted or otherwise secured to the outer side of the end members 28 and 29 and this corner construction forms a grain tight construction. The members 28 and 29 are attached to the covers 19 and 20 by sliding each end member downwardly at the ends of the cover and when they are in their lowered position engage the hopper ends 44, as was previously described, the outwardly and downwardly extending portion 45 engaging the in-turned edge 46 of the hopper ends 44.

To provide a support for the inner ends of the covers 19 and 20 and also a grain tight joint, the center supporting member 30 of the extension hopper is formed, as best shown in Figures 1 and 5. The forward end of the center supporting member 30 forming means connected to the lids 19 and 20 and to the side wall member 27 for bracing the extension hopper is cut at a diagonal and corresponds to the diagonal portion of the end members 28 and 29 at their front ends. Welded or otherwise secured is a supporting member 51 to the center supporting member 30 to engage the cover 20 and at the same time to provide means for forming a grain tight joint. The center supporting member 30 has its front end 52 bent at right angles forming a support for and means for forming a grain tight construction with the cover 19. An in-turned edge 53 of the cover 19 abuts with the center supporting member 30, as best shown in Figure 5. Similarly, the member 51 is bent at its front edge at right angles as at 54 forming a support for and a grain tight construction with the cover 20. The cover 20 also has an inwardly extending portion 53 in abutting relationship with the member 51. It is, therefore, obvious with the construction described in Figure 1 and Figure 5 that a support is formed for the covers 19 and 20 so that the covers 19 and 20 may form the front side of the extension hopper 26.

The center supporting member 30 is mounted on the side member 27 in a manner similar to the mounting of the ends 28 and 29 to the side member 27. A plurality of beaded members 55 are welded or otherwise secured to the extension hopper side member 27. Beaded members 56, 57, and 58 similar to the beaded members 39, 40, and 41 are formed on the center supporting member 30 in order that, when they are secured together by a pin or pintle 59, as best shown in Figures 1 and 4, a hinge construction is formed. It is, therefore, obvious that the center supporting member 30, as it is firmly secured to the side member 27, forms a rigid support for the extension hopper 26 and acts to support the covers 19 and 20 so that they form the front side of the extension hopper 26. The upper edges of the extension hopper 26 such as the edges of the side members 28 and 29 are rolled as at 60 and the front side member 27 is rolled as at 61 to form a bead similar to the rolled bead 25 on the covers 19 and 20, thereby preventing sharp edges so that the operator will not be hurt.

It is, therefore, obvious that, when the extension hopper is assembled, as shown in Figure 1, a grain tight hopper construction is formed wherein additional storage capacity is obtained for the usual grain tight hopper of the grain drill. It is also obvious that this construction may be supplied to other bins or hoppers where additional capacity is required. In addition, the extension hopper, which has just been described, being firmly braced and supported, besides furnishing an additional capacity for the regular grain drill hopper 15 can be used to carry further supplies of bags of grain.

As shown in Figures 3, 4, and 8, the extension hopper is shown in its knocked down position when not in use. To detach the extension hopper and to position it in its knock-down position, the pins 43 are removed from the hinge members 42 of the side member 27 and the end members 28 and 29. The pins 43 of each end member 28 and 29 are, then, positioned, as shown in Figure 3 in the beaded portion 60. In this position the pins 43 will not be lost. Next the center supporting member 30 is detached by removing the pin 59 forming a portion of the detachable means connecting the bracing means 30 with the side wall member. The covers 19 and 20 are now free to be dropped downwardly. Next the brace members 31 may be detached from their supports 34 by removing the side member 27 upwardly. As the members 31 swing rearwardly the side member 27 is now free to be dropped in its position, as shown in Figure 3 with the member 31 hanging in the position shown. The center supporting member 30 which was removed by removing the pintle 59 is, therefore, braced in the position, as shown in Figure 4 with the pin 59, as shown. In this manner the member 30 is secured to the side member 27 and may not be lost in transport. As the side member 27 is dropped downwardly in the position shown in Figures 4 and 8, the hinge connections 36 prevent the side member 27 from being detached from the upper end of the hopper, as the hinge members 36 engage the beaded portion of the hopper. The covers 19 and 20 are, therefore, free to be let down covering the hopper opening and forming the usual closure for the grain drill hopper 15. In assembling the extension hopper to the position shown in Figure 1 the procedure just described is reversed.

It will be evident that there has been provided a knock-down extension hopper for a grain drill or other dispensing device which may be readily connected to and disconnected from the usual grain hopper of the grain drill. It is also evident that the extension hopper may be either used in its assembled position or transported in its knocked down position, when it is not needed, without in any manner interfering with the usual operation of the grain drill.

The preferred embodiment of the invention herein described is capable of certain modifications without departure from the scope of the invention to be defined in the following claims.

What is claimed is:

1. The combination with a hopper of a dispensing device having a plurality of lids, and end and side wall members, of an extension hopper, said extension hopper comprising end and side wall members, one of the side wall members of the extension hopper comprising the lids of the hopper in raised position, and means for connecting the lids together forming a tight joint.

2. The combination with a hopper of a dispensing device having a plurality of lids, and end and side wall members, of an extension hopper, said extension hopper comprising end and side wall members, one of the side wall members of the extension hopper comprising the lids of the hopper in raised position, means for connecting the end wall members of the extension hopper to the lids of the hopper, means for supporting the extension hopper on the aforesaid hopper, mean connected to the lids and to the side wall member of the extension hopper for bracing the extension hopper, and means on the last mentioned means for forming a tight joint between the lids and said bracing means.

3. The combination with a hopper of a dispensing device having a pivoted lid adapted to extend across the entire width of an opening in the device, and end and side wall members, of an extension hopper, said extension hopper comprising end and side wall members, one of the side wall members of the extension hopper comprising the lid of the hopper in raised position, means for detachably connecting the end wall members of the extension hopper to the lid of the hopper, means for pivotably connecting the side wall member of the extension hopper opposite the lid of the hopper to the hopper, means for detachably connecting the end wall members of the extension hopper to the last mentioned side wall member of the extension hopper, and means detachably connected to the lid and to the last mentioned side wall member for bracing the extension hopper.

4. The combination with a hopper of a dispensing device having a lid and end and side wall members, of an extension hopper, said extension hopper comprising end and side wall members, each of the aforesaid end wall members of the extension hopper comprising means for mounting the end wall member on the end wall of the hopper, means for detachably connecting the end wall member to the lid of the hopper, and means for detachably connecting the end wall member to the side wall member of the extension hopper opposite the lid of the hopper; whereby tight joints are formed between the extension hopper and the dispensing hopper and the end wall members and the side wall members of the extension hopper, each of the aforesaid end members of the extension hopper having a rolled edge at its upper edge and means for securing the end and side wall members of the extension hopper together comprising an elongated pin member; whereby, when said pin member is detached to collapse the extension hopper, the pin member is adapted to be received by the rolled edge of the end member.

5. The combination with a hopper of a dispensing device having a lid adapted to extend across the entire width of an opening in the device, and end and side wall members, of an extension hopper, said extension hopper comprising end and side wall members, one of the aforesaid side wall members of the extension hopper comprising means for pivotably mounting the side wall member on the dispensing hopper opposite the lid of said hopper, and means for detachably connecting the end wall members to said side wall member of the extension hopper; whereby tight joints are formed between the side wall member and the dispensing hopper and the side and end wall members of the extension hopper.

6. The combination as set forth in claim 5, detachable means for bracing the side wall member of the extension hopper opposite the lid connected to the side wall member of the extension hopper and to the dispensing hopper; whereby, in one position of the detachable means, the side wall member of the extension hopper is braced and in the detached position of the aforesaid means, the side wall member may be collapsed with respect to the dispensing hopper.

7. The combination as set forth in claim 5, means detachably connected to the lid and to the side wall member of the extension hopper for bracing the extension hopper.

8. The combination with a hopper of a dispensing device having a plurality of lids, and end and side wall members, of an extension hopper, said extension hopper comprising end and side wall members, one of the aforesaid side wall members of the extension hopper comprising means for pivotally mounting the side wall member on the dispensing hopper opposite the lid of said hopper, means for detachably connecting the end wall members to said side wall member of the extension hopper, means detachably connected to the lids and to the side wall member of the extension hopper for bracing the extension hopper and forming a tight joint between the lids in the extended position of the hopper.

9. The combination as set forth in claim 8, detachable means connecting the aforesaid bracing means between the lids and the side wall member of the extension; whereby, in the collapsed position of the extension hopper, the aforesaid bracing means is mounted on the side member of the extension hopper.

10. The combination with a hopper of a dispensing device having a lid, and end and side wall members, of an extension hopper, said extension hopper comprising end and side wall members, each of the aforesaid end wall members of the extension hopper comprising means for mounting said end wall members of the extension hopper on the lid of the dispensing device; whereby, when said lid of the dispensing hopper is in its closed position, the end wall members of the extension hopper are positioned adjacent the end wall members of the dispensing hopper.

11. The combination with a hopper of a dispensing device having a lid and end and side wall members, of a collapsible extension hopper, said extension hopper comprising end and side wall members, and means for detachably mounting said side and end wall members of said extension hopper on said dispensing hopper; whereby, when said extension hopper is collapsed, a side wall member of the extension hopper is mounted on a side wall member of the dispensing hopper, the lid of the dispensing hopper overlies a portion of said side wall member of the extension hopper, and the end walls of the extension hopper are mounted on the lid adjacent the end walls of the dispensing hopper.

12. The combination with a hopper of a dispensing device having a plurality of lids and end and side wall members, of a collapsible extension hopper comprising end and side wall members, detachable means for bracing the side wall members of the collapsible extension hopper in its extended position, one of the side wall members of the extension hopper in its extended position being the lids of the dispensing device, and means for detachably mounting said side and end wall members of said extension hopper on said dispensing hopper; whereby, when said extension hopper is collapsed, the detachable means for bracing the side wall members of the collapsible extension hopper overlies the side wall member of the extension hopper opposite the lids of the dispensing device.

ARNOLD E. W. JOHNSON.
GEORGE M. KRIEGBAUM.